Patented Dec. 4, 1951

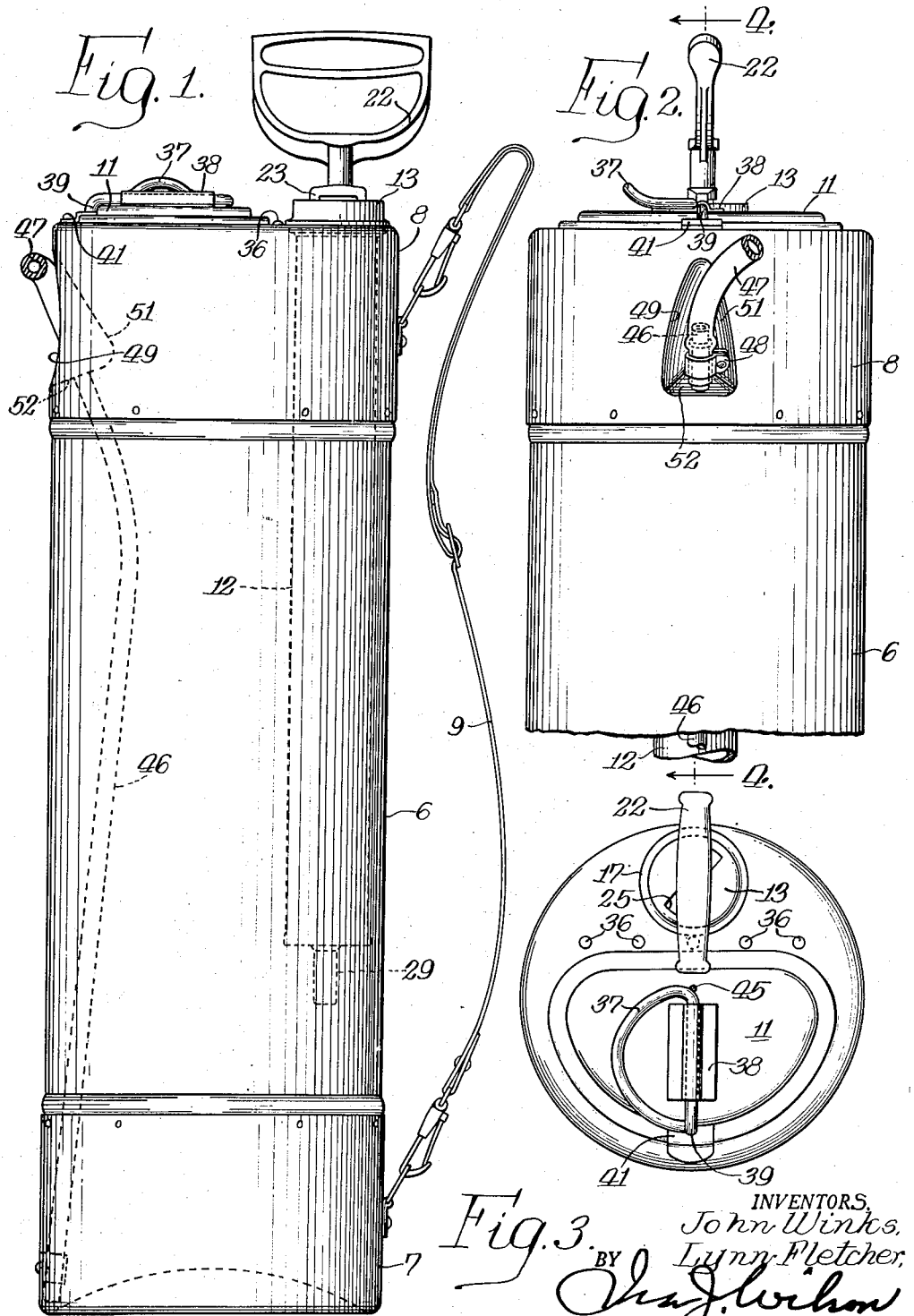

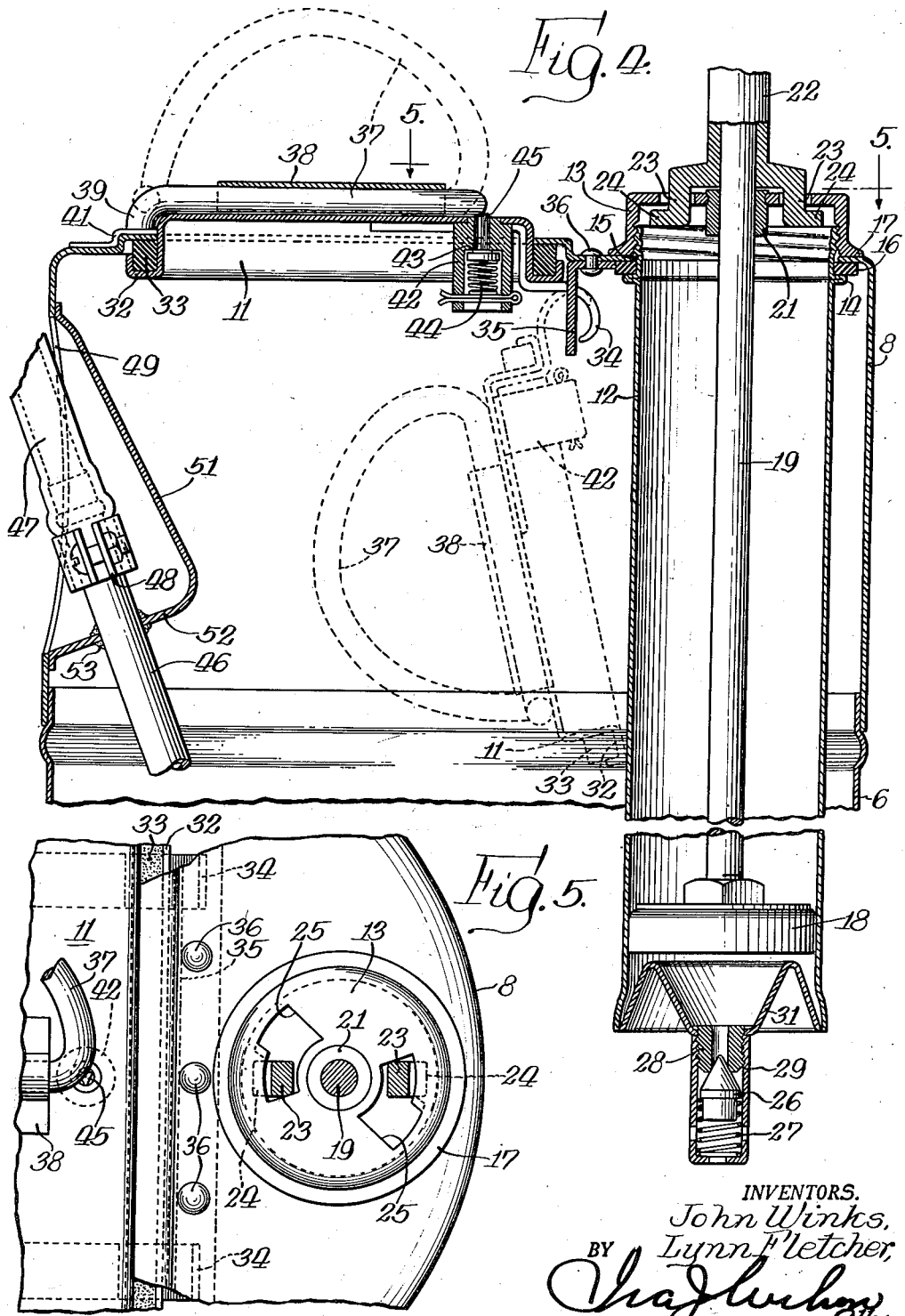

2,577,221

UNITED STATES PATENT OFFICE 2,577,221

CLOSURE MECHANISM FOR PRESSURE TYPE VESSELS

John Winks and Lynn Fletcher, Lowell, Mich., assignors to Lowell Specialty Company, Lowell, Mich., a corporation of Michigan Original application June 13, 1945, Serial No. 599,258. Divided and this application January 10, 1947, Serial No. 721,400

7 Claims. (Cl. 220—25)

1

The invention relates to closures for pressure-type vessels and, more particularly, to mechanisms for closing, locking, unlocking and opening vessels which may be under substantial internal pressures. While features of the invention are applicable to pressure vessels of various types used for many purposes, it is ideally adapted for use in pressure-type portable sprayers for which reason it will be disclosed herein in such application. This patent application is a division of our patent application Serial Number 599,258, filed June 13, 1945, now Patent No. 2,529,645.

Pressure vessels require tight fitting closures or covers for access openings and generally employ complicated mechanisms for securing and locking such covers or closures in place. In some types the closure member is arranged to close from the exterior of the vessel or "against the pressure" and in other types the closure is applied from the interior of the vessel and closes "with the pressure" and the latter type has been chosen for exemplification of the invention hereof. Many such vessels employ a pressure relief valve for relieving pressure built up within the vessel and while relief of the internal pressure before opening the vessel is desirable as a safety measure regardless of the manner in which the closure is applied, relief of pressure is almost indispensable in types employing closures which close "with the pressure" and open against the pressure, in order to effect the opening operation.

Ordinarily the pressure relief valve is opened by hand or some simple tool to effect relief of pressure, but if the contents of the vessel should be of such nature as to be susceptible of injuring a person, as would be the case in the event the vessel contains steam, acid or poisonous material, the pressure relief should not be opened in such manner as to endanger the user's person, clothing, etc. Furthermore the arrangement should be such that the closure is prevented from opening until the internal pressure of the vessel has been reduced to a negligible quantity.

One of the primary objects of the invention, therefore, is to provide a cover locking and releasing mechanism, for pressure vessels, which will serve at once to close and secure the cover in place with a tight fit between cover and vessel and, at the same time, will not be releasable to permit the cover to be opened unless and until the pressure within the vessel has been released. In this connection a feature of the invention resides in a cooperative relationship between a handle for opening and closing the cover, a cover lock and a pressure relief valve.

2

Another important feature lies in an arrangement of the cover, in a preferred embodiment, so that it hinges on the inside of the pressure vessel and closes "with the pressure," thereby to protect the cover, hinge, gasket or other seal and other related parts against dirt and injury as well as to insure a seal (the pressure within the vessel tending to effect a tight joint seal) and to aid in preventing opening of the closure except after release of pressure through a relief valve or the like.

Still another objective is to provide a novel and simple locking mechanism in which the handle, by which the cover is manipulated in opening and closing the access (or filling) opening, also serves, in cooperation with a marginal portion of the vessel about the access opening, to wedge and lock the cover in its closed position, the handle being arranged to lie substantially flat against the surface of the cover when the cover is closed and locked thereby being disposed out of the way of injury or doing injury.

Many other objects as well as the uses and advantages of the invention will be appreciated and understood upon reading the following description and claims and after viewing the drawings in which:

Fig. 1 is a side elevation of a spraying apparatus embodying our invention;

Fig. 2 is a fragmentary elevation of the upper portion of the apparatus looking toward the right at Fig. 1;

Fig. 3 is a plan view of the structures of Figs. 1 and 2;

Fig. 4 is an enlarged sectional view on the line 4—4 of Fig. 2; and

Fig. 5 is a fragmentary sectional view on the line 5—5 of Fig. 4.

Referring to the drawings more in detail, it will be observed that the liquid container, which is of generally cylindrical form, is for purposes of strength and for economy in manufacture made up of a central cylinder 6 of relatively light sheet metal and a bottom 7 and top 8 of heavier sheet metal adapted to withstand the impacts to which such a container is subjected in ordinary usage. The top and bottom are securely attached to the intermediate portion 6, preferably by riveting and soldering, and in this manner the weight of the container is reduced over what it would be if made entirely of the heavier metal comprising the top and bottom, while the ends, where injury is most likely to occur, are sufficiently strong and heavy to meet the requirements.

In use the container is carried by a shoulder strap 9 slung over the shoulder of the user. The end wall of the top 8 is provided, as will be apparent from Figs. 3 and 4, with two openings, the larger, roughly oval in shape, being the filling opening adapted to be closed by the cover 11, and the smaller, of circular shape, being adapted to accommodate the pump cylinder 12, the upper end of which is threaded for connection with the flanged pump cap 13.

The pump cylinder is provided near its upper end with a circumferential bead or shoulder 14 which is larger in diameter than the pump opening 15 in the end of the container, and a gasket 16 interposed between the shoulder 14 and the margins surrounding the opening 15 serves to provide a hermetic seal when the cap 13 is threaded into snug engagement with the end wall so that the wall is snugly clamped between the flange 17 of the cap and the gasket 16. In this manner the pump is suspended and rigidly held within the container entirely independently of the filler opening and its closure 11. The parts are assembled by introducing the pump cylinder into the container through the filler opening and then projecting its upper end outwardly through the opening 15, whereupon the cap 13 may be threaded into clamping position, as shown.

A piston 18 reciprocable in the cylinder 12 by a piston rod 19 extends through a guide 21 carried by the cap 13 and is attached at its upper end to a handle 22 by which the piston is operated. The handle is provided with legs 23 terminating in outwardly disposed flanges 24, and the cap 13 is provided with openings enlarged at one end, as indicated at 25, to permit the passage therethrough of the flanges 24, but of reduced width at the other end so that upon rotative movement of the handle in a counter-clockwise direction viewing Fig. 5 the flanges 24 will be positioned beneath the margins of the narrow portions of the openings. The handle, therefore, cannot be pulled away from the cap. Thus the handle is locked in its innermost position when the pump is not being used, and in such position it may serve as a carrying handle by which the entire sprayer may be carried. The handle when engaged with the cap, as shown in Figs. 4 and 5, may be employed in applying the cap to or removing it from the upper end of the cylinder by a rotative movement. While the pump normally remains in its mounted position, the piston may be withdrawn for repair or replacement purposes by disconnecting the cap 13 and lifting the cap and piston away from the cylinder by means of the handle 22.

The lower end of the pump, which projects beneath the level of the liquid in the container when the container is nearly one-half filled or more, is provided with an open valve chamber which contains a check valve 26 urged by a spring 27 into engagement with a seat formed in an apertured plug 28 threaded into the valve chamber 29 and serving to connect this nipple with the bottom 31 of the pump. The check valve permits discharge of air by the pump piston into the container to build up pressure therein and prevents reverse flow of liquid or air into the pump cylinder.

The cover 11 for the filler opening is provided, as shown in Fig. 4, with a peripheral flange 32 providing a seat for a gasket 33 which forms a seal between the cover and the container around the filler opening. The oblong shape of the opening and cover permits the introduction of the cover endwise into the container where it is hingedly supported by engaging a pair of hooks 34 mounted on the cover in eyes of a bracket 35 suspended from the upper wall of the container. This bracket is held in place by a plurality of rivets 36. The hinging of the cover on the bracket is readily accomplished by reaching in through the filler opening. When once mounted as illustrated, the cover remains hinged to the bracket until manually disconnected therefrom for removal of the gasket or other repair purposes.

Upon the outer face of the cover 11 a substantially D-shaped handle 37 made of rod stock is mounted by means of a keeper 38 for lateral oscillatory movement and longitudinal reciprocatory movement with respect to the cover. The free end of the pivoted portion of the handle is downturned, as indicated at 39, Fig. 4, for engagement with a wear plate 41 when the handle is laid flat upon the cover (as shown in Fig. 3), to thereby lock the closure in closed position and establish an hermetic seal for the cover. This is the normal position of the parts, and the locking projection 39, by reason of its projection over a corner of the cover, is held against retraction so long as the handle is not swung to thereby raise the projection 39 above the plane of the cover.

Since a substantial pressure, dependent upon the extent of manipulation of the hand pump, is established and maintained within the container during operation, such pressure will hold the cover in closed position regardless of the locking member 39. Should access to the interior of the container become necessary, relief of the internal pressure so as to release the cover is desirable. For this purpose we have mounted upon the under side of the cover 11 a small housing 42 providing a valve seat for a valve 43 which is urged into seated position by a spring 44. This valve, therefore, remains normally closed when the handle is down against the cover and the projection 39 is engaged with the plate 41. The stem 45 of the valve projects above the surface of the cover in alignment with the pivoted portion of the handle 37. Therefore, as the handle is slid to the right viewing Fig. 4, or upwardly viewing Fig. 3, the handle first rides over and depresses the stem 45, thereby opening valve 43 to relieve the pressure within the container and thereafter the projection 39 clears the marginal edge of the vessel about the opening. When the pressure is thus relieved, the cover, having been unlocked by the aforesaid movement of the handle, is free to swing downwardly under the influence of gravity from the full line to the dotted line position shown in Fig. 4.

Under the influence of the air pressure built up in the container by the manipulation of the pump, the liquid therein is discharged through a tube 46 to the outer projecting end of which a flexible hose 47 carrying the spray nozzle (not shown) is connected by means of a hose clamp 48.

Prior to our invention the tube 46 has been extended through a wall of the container so that its end to which the hose was attached extended beyond the perimeter of the container. In use, particularly where vines, branches and the like were prevalent, the hose clamp would, not infrequently, become caught on such vine, branch or the like and as a result the hose would become disconnected from the tube with consequent loss under pressure of a portion and sometimes practically all of the liquid in the container. This objectionable feature, however, is overcome in the present instance by locating the hose clamp within instead of outside the peripheral confines of the container. This we have accomplished by providing a hole 49 in the container wall and covering the hole on the inside with an angular metal piece 51 shaped in contour to conform to the outlines of the hole and provide a wall 52 through which the tube 46 projects and to which it is fixedly secured by solder 53. The end of the tube 46 is, therefore, disposed in the recess formed by the angle member 51 and the hose clamp by which the hose is connected to the tube is disposed within the confines of the container where it cannot contact with or catch onto obstacles such as vines and the like which would be apt to disconnect the hose from the tube.

It should be apparent from the foregoing that we have provided a spraying apparatus embodying a number of advantageous features. The construction of the container itself possesses both strength and lightness, and is economical to produce. The pump is permanently mounted in the container entirely independently of the filler opening and its permanent mounting is not interfered with when refilling of the container is required. The mounting, however, is such that the piston of the pump may be removed for inspection or repairs without removing the pump cylinder. The closure for the filler opening is hingedly mounted inside the container, whereby it closes with rather than against the pressure, thus insuring a hermetic seal. A locking handle locks the closure in closed position and provides an initial seal, and a relief valve is arranged to be opened when the handle lock is released, thereby relieving the container pressure and permitting the closure to open under the influence of gravity. Finally, the connection between the nozzle hose and the delivery tube is disposed within the peripheral confines of the container, thus accidental displacement of the hose from the tube is minimized.

The structural details illustrated and described may obviously be varied within considerable limits without departing from the scope of our invention as defined in the following claims.

We claim:

1. In a pressure-type vessel having an access opening, a pressure-tight closure for said opening, and a relief valve for relieving pressure within said vessel, means for opening and closing said closure comprising, a handle member pivotally and slidably mounted on said closure for movements to each of two predetermined positions relative thereto, means carried by the handle and cooperative with the container at one of said positions for securing the closure in closed position over said access opening, and means carried by the handle and cooperative with said pressure relief valve at the second position for opening said valve to relieve the pressure in the vessel.

2. In a pressure-type vessel having an access opening, a pressure-tight closure for said opening, and a relief valve for relieving pressure within said vessel, means for opening and closing said closure comprising, a handle member pivotally mounted on said closure for swinging movements about its pivot axis and movements longitudinally of its axis to each of two predetermined positions relative thereto, means carried by the handle and cooperative with the container when the handle is swung about its axis to one of said positions for securing the closure in closed position over said access opening, and means carried by the handle and cooperative with said pressure relief valve when the handle is moved longitudinally of its axis to the second position for opening said valve to relieve the pressure in the vessel.

3. In a pressure-type vessel having an access opening, a closure member for effecting pressure-tight closure of said opening and a valve for relieving the pressure in said vessel, means for locking said closure in closed position and for unlocking and opening said closure comprising, a handle member hinged to said closure on an axis extending substantially parallel to the general plane of the opening and movable in a path about said hinge from one predetermined position to another, said handle also being movable in another path between predetermined positions relative to the closure, cooperative means on said vessel and handle for locking said closure in pressure-tight engagement with said vessel when the handle is moved in the first said path to one of said predetermined positions, and means operated by said handle as it is moved in the second said path from the last said predetermined position for opening said pressure relief valve.

4. In a pressure-type vessel having an access opening, a closure member for effecting pressure-tight closure of said opening and a valve for relieving the pressure in said vessel, means for locking said closure in closed position and for unlocking and opening said closure comprising, a handle member hinged to said closure on an axis extending substantially parallel to the general plane of the opening and movable through a predetermined arc from one predetermined position to another, said handle also being movable between predetermined positions relative to the closure in the direction of its hinge axis, cooperative means on said vessel and handle for locking said closure in pressure-tight engagement with said vessel when the handle is moved to one of said predetermined positions, and means operated by said handle as it is moved from the last said predetermined position for opening said pressure relief valve.

5. A pressure apparatus, comprising a container with an access opening, a closure for said access opening hinged within the container and adapted to close said opening with the pressure in the container, a relief valve carried by said closure and arranged to open against and to close with the pressure in the container, and a handle mounted on said closure for swinging movements about a horizontal axis and for movements longitudinally of its said axis, said handle having a locking cam projection at one end and said container having an external cam engaging surface for engagement by said cam projection when said handle is swung in one direction about said axis to secure said closure over said access opening, said cam projection being disengaged from said surface when the handle is swung in the opposite direction, said relief valve being positioned in the path of said handle when the handle is moved longitudinally of its axis and engageable thereby upon such movement whereby to open the valve.

6. In a pressure apparatus comprising a pressure vessel having an access opening and a closure adapted to seal with the pressure against the margin of the vessel defining said opening, a handle mounted on said closure at its exterior side for movements therewith and relative thereto, cooperative camming means carried by said vessel and by said handle, said camming means being interengageable when said closure is in sealing position and said handle is moved in one direction relative to said closure and disengageable when the handle is moved in a reverse direction, interengagement of said camming means being effective to draw said closure into sealing engagement with said vessel margin, disengagement of the camming means being effective to release said closure, and means in the path of movement of and engageable by said handle in its movement relative to said closure in disengagement of said camming means for releasing the pressure within said vessel.

7. In a pressure apparatus comprising a pressure vessel having an access opening and a closure adapted to seal with the pressure against the margin of the vessel defining said opening, a handle mounted on said closure at its exterior side for movements therewith and relative thereto, cooperative camming means carried by said vessel on its exterior adjacent to said closure and by said handle, said camming means being interengageable when said closure is in sealing position and said handle is moved in one direction relative to said closure and disengageable when the handle is moved in a reverse direction, interengagement of said camming means being effective to draw said closure into sealing engagement with said vessel margin, disengagement of the camming means being effective to release said closure, and pressure release valve means having a stem in the path of movement of and engageable by said handle in its movement relative to said closure in disengagement of said camming means for releasing the pressure within said vessel.

JOHN WINKS.
LYNN FLETCHER.

REFERENCES CITED

The following references are of record in the file of this patent:

UNITED STATES PATENTS

| Number | Name | Date |
|---|---|---|
| 588,063 | Hewens | Aug. 10, 1897 |
| 1,106,837 | Pfaehler et al. | Aug. 11, 1914 |
| 1,108,765 | Lawless | Aug. 25, 1914 |
| 1,168,933 | Burkley et al. | Jan. 18, 1916 |
| 1,683,102 | Sanftleben | Sept. 4, 1928 |
| 1,709,915 | Morris | Apr. 23, 1929 |
| 1,947,149 | Aupke | Feb. 13, 1934 |
| 2,403,065 | Engert | July 2, 1946 |

FOREIGN PATENTS

| Number | Country | Date |
|---|---|---|
| 6,819 | Great Britain | 1889 |